(12) United States Patent
Sun et al.

(10) Patent No.: US 11,539,091 B2
(45) Date of Patent: Dec. 27, 2022

(54) BATTERY MODULE

(71) Applicant: Industrial Technology Research Institute, Hsin-Chu (TW)

(72) Inventors: Chein-Chung Sun, Kaohsiung (TW); Chih-Ting Chen, New Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 16/729,578

(22) Filed: Dec. 30, 2019

(65) Prior Publication Data
US 2021/0184188 A1 Jun. 17, 2021

(30) Foreign Application Priority Data
Dec. 16, 2019 (TW) .................................. 108216707

(51) Int. Cl.
*H01M 50/20* (2021.01)
*H01M 10/653* (2014.01)
*H01M 10/655* (2014.01)
*H01M 50/209* (2021.01)

(52) U.S. Cl.
CPC ......... *H01M 50/20* (2021.01); *H01M 10/653* (2015.04); *H01M 10/655* (2015.04); *H01M 50/209* (2021.01)

(58) Field of Classification Search
CPC .. H01M 50/20; H01M 10/653; H01M 10/655; H01M 50/209
See application file for complete search history.

(56) References Cited

U.S. PATENT DOCUMENTS

| | | | |
|---|---|---|---|
| 2002/0070704 A1* | 6/2002 | Abe ..................... | H01M 50/502 320/112 |
| 2009/0053585 A1* | 2/2009 | Nakazawa ............ | H01M 50/20 429/120 |
| 2012/0177972 A1 | 7/2012 | Lai et al. | |
| 2013/0196184 A1* | 8/2013 | Faass .................. | H01M 10/643 429/50 |
| 2015/0200429 A1 | 7/2015 | Ee et al. | |

FOREIGN PATENT DOCUMENTS

| | | |
|---|---|---|
| CN | 201708215 U | 1/2011 |
| CN | 102025006 | 4/2011 |
| CN | 201893392 U | 7/2011 |

(Continued)

*Primary Examiner* — Olatunji A Godo
(74) *Attorney, Agent, or Firm* — WPAT, PC

(57) ABSTRACT

A battery module includes a housing, at least one cell stack inside the housing, a tightening assembly and a thermal conductive element. The tightening assembly includes first and second plugin members. The first plugin member has a first stopping portion and a first bolt portion connected with the first stopping portion, and the first bolt portion is tapered from the first stopping portion. The second plugin member has a second stopping portion and a second bolt portion connected with the second stopping portion, and the second bolt portion is tapered from the second stopping portion. The first and second plugin members are detachably inserted into the battery module from two opposing sides of the cell stack. The thermal conductive element tightens the cell stack to the housing.

14 Claims, 18 Drawing Sheets

(56) References Cited

FOREIGN PATENT DOCUMENTS

| | | |
|---|---|---|
| CN | 202817122 U | 3/2013 |
| CN | 204391181 U | 6/2015 |
| CN | 104779422 | 7/2015 |
| CN | 204464359 U | 7/2015 |
| CN | 208423076 | 1/2019 |
| JP | H11345512 A | 12/1999 |
| TW | I354394 | 12/2011 |
| TW | I426637 | 2/2014 |
| TW | I489674 | 6/2015 |
| TW | I502790 | 10/2015 |
| TW | I610487 | 1/2018 |
| WO | WO2019026676 | 2/2019 |
| WO | WO2019027149 | 2/2019 |
| WO | WO2019027150 A1 | 2/2019 |
| WO | WO2019027162 A1 | 2/2019 |

\* cited by examiner

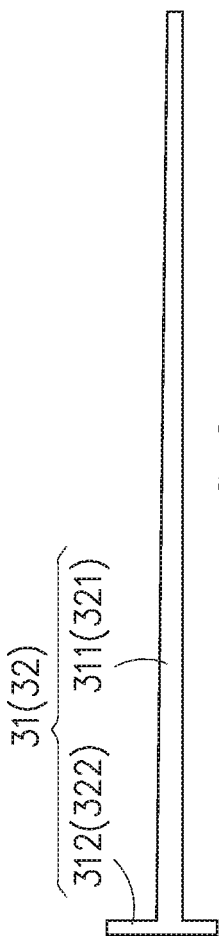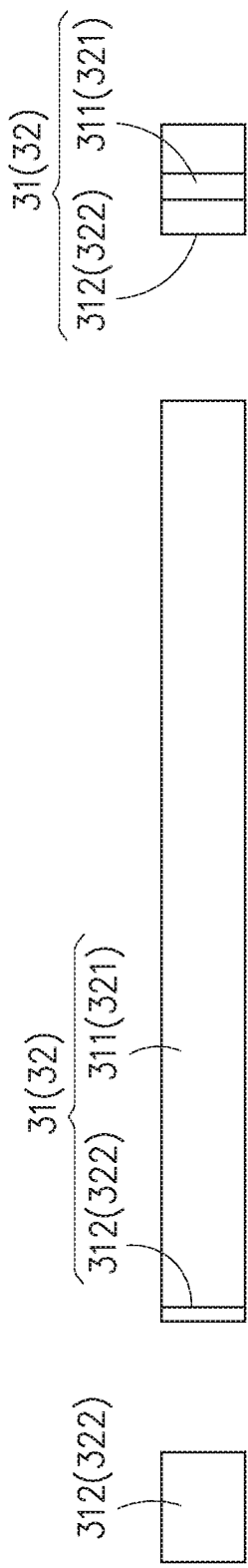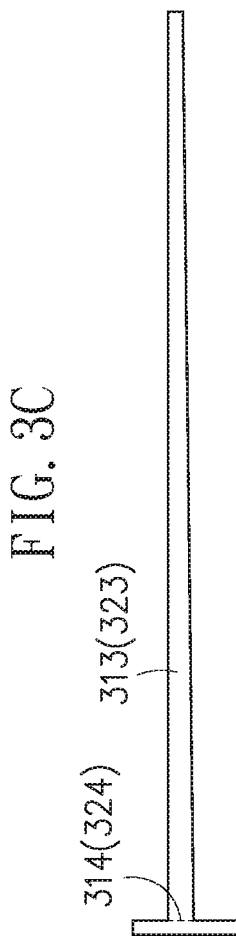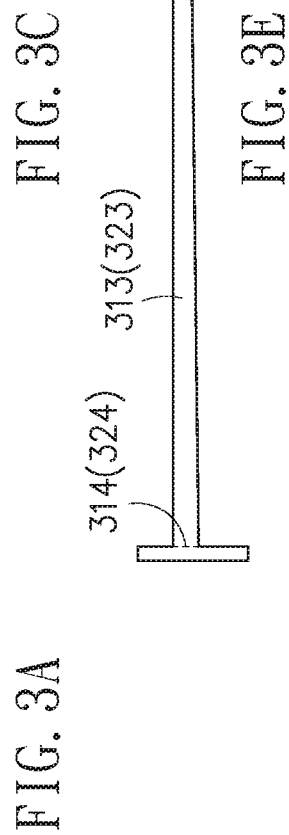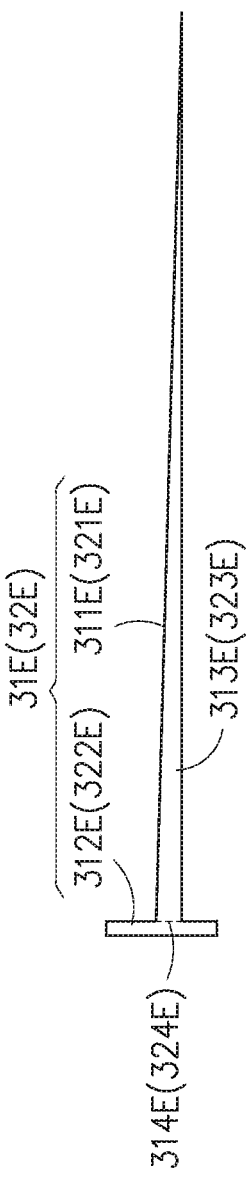

BATTERY MODULE

CROSS REFERENCE TO RELATED APPLICATION

This application claims the benefits of Taiwan application Serial No. 108216707, filed on Dec. 16, 2019, the disclosures of which are incorporated by references herein in its entirety.

TECHNICAL FIELD

The present disclosure relates in general to a battery module, and more particularly to the battery module that utilizes squeeze-fit manners to conduct effectively battery heat to and further out of a housing thereof.

BACKGROUND

In the art, housing, casing, frames or packaging for containing battery modules is usually served for preventing battery cells and electric/electronic components there inside, including those for battery management and conduction arrangement, from physical damages, unexpected internal movements, electric leakages, heat accumulations, water and dust invasions, and so on.

To achieve purposes of destruction-free, kinematic limitations, electric insulation, heat dissipation, waterproof and dust-proof, existing means for packaging the conventional battery module include at least two as described below.

(i) A means using two clamp plates: Two vertical lateral side plates are introduced to sandwich cell stacks by providing specific tightening forcing through connection screws. One shortcoming of this means is that specific rooms are needed for constructing lock or screw points, and thus additional arrangement for waterproofing would be required.

(ii) A means for fixing the cell stacks: Apply fasteners such as bolts, lock bars, elastic belts and metallic strip to firmly fix the cell stacks. Beside specific rooms are needed for constructing lock or screw points, and thus additional arrangement for waterproofing would be required; another shortcoming is that a resulting appearance of the battery module showing these fasteners would be not beautiful but cumbersome.

In addition, conventional heat-dissipation pathways for the battery module include: (1) one that introduces a work fluid (including gas, water or oil) to circulate the heat out of the packaging material of the battery module; and, (2) another that introduces a housing to contain and contact directly the cell stacks so as to establish a direct conduction pathway to dissipate the internal heat. In both the aforesaid pathways, additional development cost for pathway design and space arrangement would be inevitable.

Hence, an improvement of the battery module that can provide a superior heat-dissipation design for the battery module for effectively dissipating the internal heat out of the housing is definitely urgently needed and welcome to the skill in the art.

SUMMARY

In one embodiment of this disclosure, a battery module includes:
a housing;
at least one cell stack, disposed inside the housing;
a tightening assembly, including:
a first plugin member, having a first stopping portion and a first bolt portion connected with the first stopping portion, the first bolt portion being extended in a tapering manner away from the first stopping portion; and
a second plugin member, having a second stopping portion and a second bolt portion connected with the second stopping portion, the second bolt portion being extended in the tapering manner away from the second stopping portion;
wherein the first plugin member and the second plugin member are individually and detachably inserted into the battery module from two opposing sides of the at least one cell stack, and a second surface of the at least one cell stack with respect to a first surface is tightened to the housing; and
a thermal conductive element, disposed on the second surface, tightening the second surface of the at least one cell stack to the housing.

In another embodiment of this disclosure, a battery module includes:
a housing;
at least one cell stack, disposed inside the housing;
a stuff-insert element, disposed in a gap formed between a first surface of the at least one cell stack and the housing, a second surface of the at least one cell stack with respect to the first surface being tightened to the housing; and
a thermal conductive element, disposed on the second surface, tightening the second surface of the at least one cell stack to the housing through the thermal conductive element.

In a further embodiment of this disclosure, a battery module includes:
a housing;
a plurality of cell stacks, disposed inside the housing;
a stuff-insert element, disposed in a gap formed between the plurality of cell stacks, a second surface of the plurality of cell stacks with respect to a first surface being tightened to the housing; and
a thermal conductive element, disposed on the second surface, tightening the second surface of the plurality of cell stacks to the housing through the thermal conductive element.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIGS. 3A~3E are schematic front, rear, right-side, top and bottom views of an embodiment of the first plugin member (or the second plugin member) of FIG. 1, respectively;

FIG. 3F is a schematic bottom view of another embodiment of the first plugin member (or the second plugin member) of FIG. 1;

DETAILED DESCRIPTION

Figure 1:
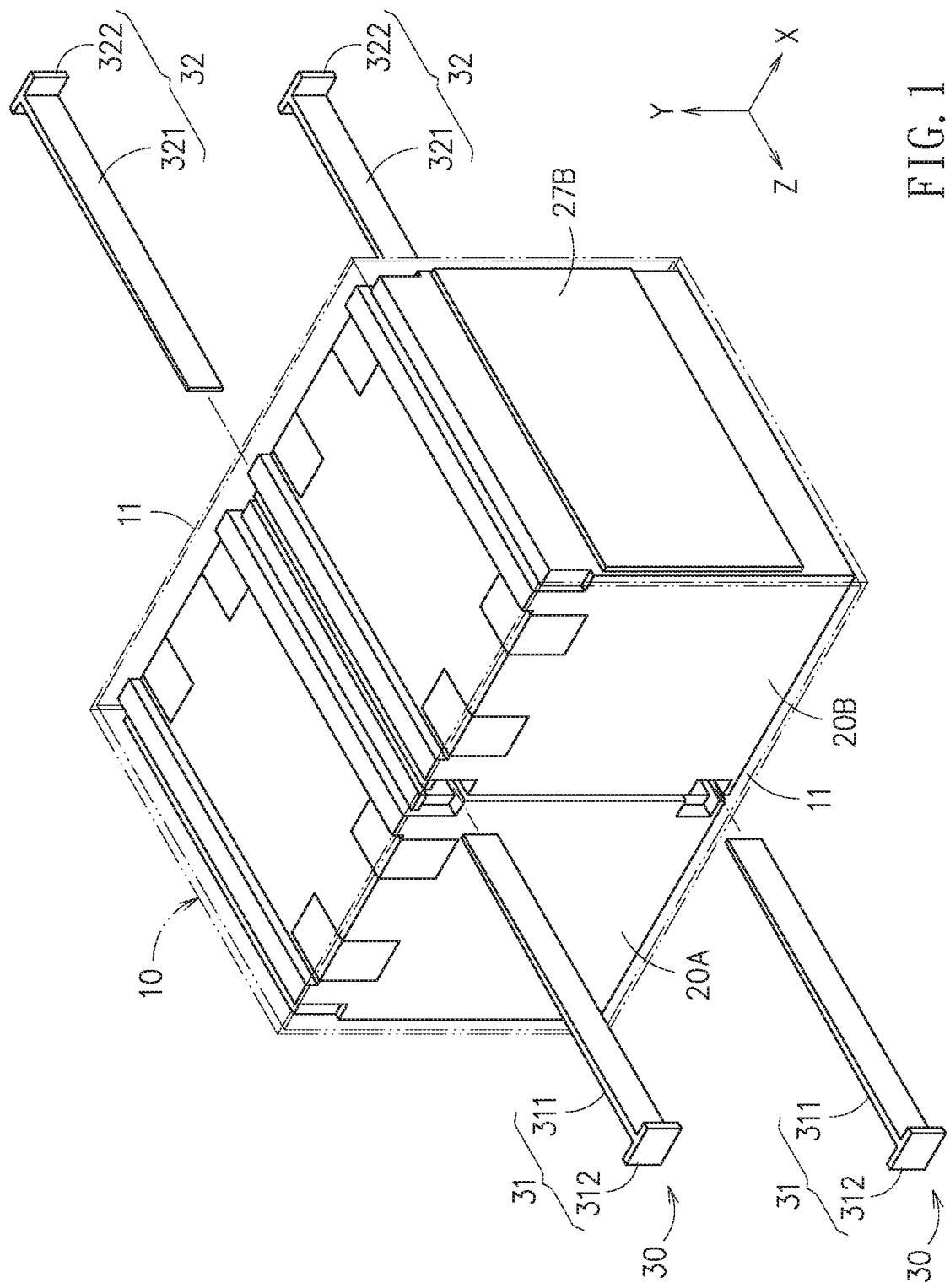
FIG. 1 is a schematic perspective view of an embodiment of a tightening assembly in accordance with this disclosure, showing by which two cell stacks are tightly fitted to a housing in a direction parallel an X-axis.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2A:
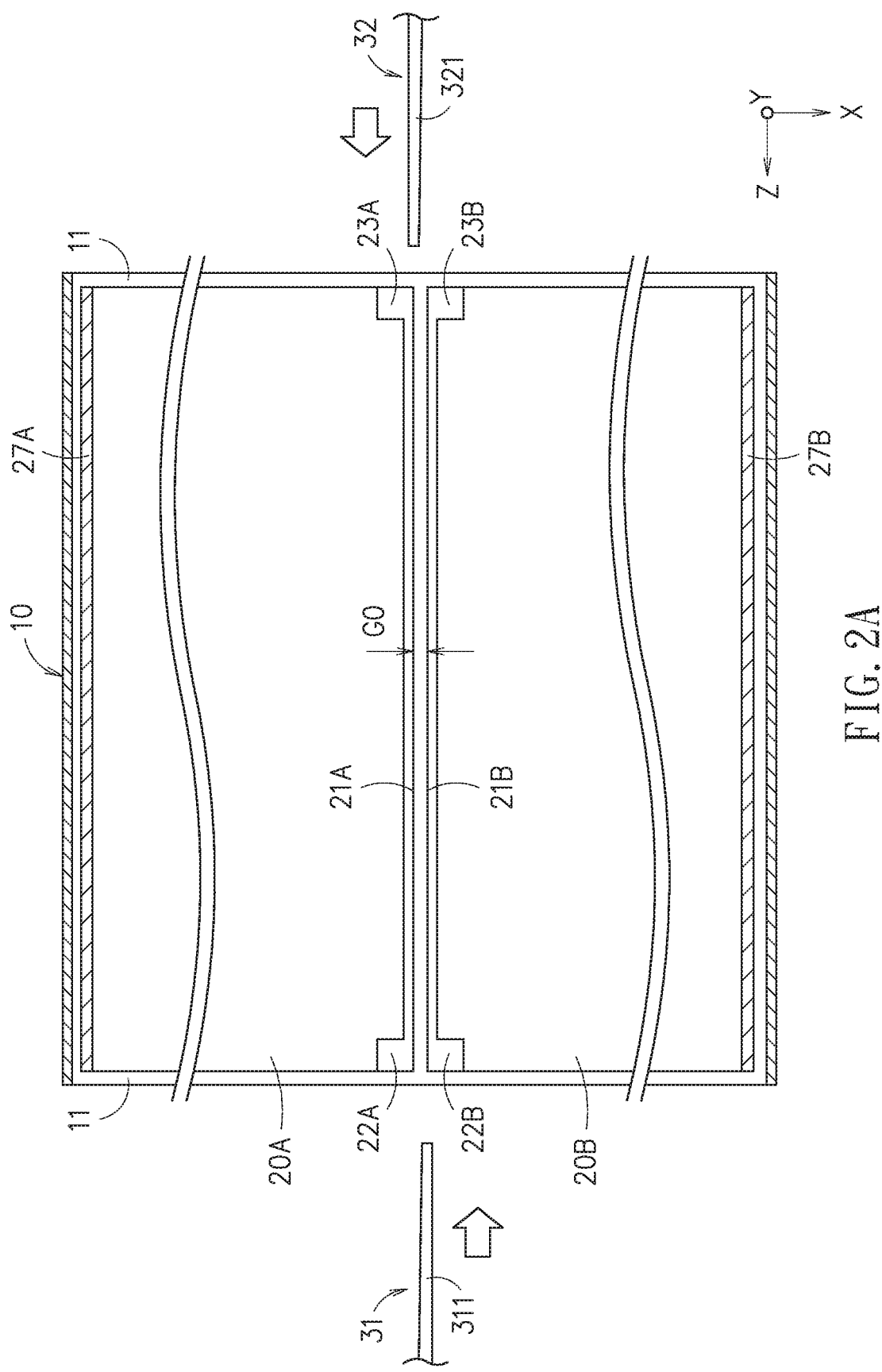
FIGS. 2A~2C demonstrate schematically three consecutive operations, in respective top views, for tightening the two cell stacks by the tightening assembly of FIG. 1.

Referring to FIG. 1 and FIG. 2A, the battery module is furnished with two cell stacks 20A, 20B inside a housing 10. In this embodiment, the housing 10 has two opposite and parallel open sides 11 in a Z-axial direction for the two cell stacks 20A, 20B to be mounted inside the housing 10 through any of the two open sides 11.

In order to mount the cell stacks 20A, 20B easily into the housing 10, the cell stacks 20A, 20B and the housing 10 are usually matched in a loose-fit manner, and thus a gap G0 would exist between the two cell stacks 20A, 20B and the housing 10. In order to avoid movements of the two cell stacks 20A, 20B inside the housing 10 so as to generate damages from unexpected collisions in between, and also in order to enhance entire heat-dissipation performance, thermal conductive elements (27A, 27B for example) are furnished onto at least one surface of each of the cell stacks 20A, 20B that contacts the housing 10. According to this disclosure, a tightening assembly 30 is further provided to tighten firmly (i.e., in a close-fit manner) the two cell stacks 20A, 20B to the housing 10 via the thermal conductive elements 27A, 27B.

As shown in FIG. 1 and FIG. 2A, firstly, a first plugin member 31 and a second plugin member 32 of the tightening assembly 30 are inserted into the space between the two cell stacks 20A, 20B from opposing sides thereof. In this embodiment, two tightening assemblies 30 arranged in a direction parallel the Y-axis are individually furnished to the neighbor corner edges on upper and lower surfaces of the two cell stacks 20A, 20B. In this embodiment, the first plugin member 31 and the second plugin member 32 are symmetric to each other in shape.

Referring now to FIG. 1 and FIGS. 3A~3E, the first plugin member 31 and the second plugin member 32 of the tightening assembly 30 would be elucidated in detail. The first plugin member 31 includes a first bolt portion 311 and a first stopping portion 312 connected structurally with the first bolt portion 311. The first bolt portion 311 extends in a tapering manner from a first end surface 314 thereof connected with the first stopping portion 312 to another free end thereof away from the first stopping portion 312. In this embodiment, the first bolt portion 311 is embodied as a quadrangular tapering cylinder having a trapezoidal lateral side surface 313 extending longitudinally and the first end surface 314 connecting structurally the first stopping portion 312.

Since the first plugin member 31 and the second plugin member 32 are shaped and structured the same, but posed in a symmetric manner to each other, thus FIGS. 3A~3E can be also applicable to detail the second plugin member 32 of this embodiment. Namely, the second plugin member 32 includes a second bolt portion 321 and a second stopping portion 322 connected structurally with the second bolt portion 321. The second bolt portion 321 extends in a tapering manner from a second end surface 324 thereof connected with the second stopping portion 322 to another free end thereof away from the second stopping portion 322. In this embodiment, the second bolt portion 321 is embodied as a quadrangular tapering cylinder having a trapezoidal lateral side surface 323 extending longitudinally and the second end surface 324 connecting structurally the second stopping portion 322.

Referring now to FIG. 3F, in this embodiment, the first plugin member 31E includes a first bolt portion 311E and a first stopping portion 312E. The first bolt portion 311E is embodied as a first right-triangular cylinder extending longitudinally out from a first end surface 314E that is connected structurally with the first stopping portion 312E. A first lateral side surface 313E of the first bolt portion 311E elongated along the first right-triangular cylinder, and the right angle of the first lateral side surface 313E is located at the connection ends of the first bolt portion 311E and the first stopping portion 312E. Namely, the first end surface 314E and the first lateral side surface 313E form the right angle of the first right-triangular cylinder.

Similarly, the formulation concept of the first plugin member 31 and the second plugin member 32 is applicable to form the second plugin member 32E of FIG. 3F. As shown, the second plugin member 32E includes a second bolt portion 321E and a second stopping portion 322E. The second bolt portion 321E is embodied as a second right-triangular cylinder extending longitudinally out from a second end surface 324E that is connected structurally with the second stopping portion 322E. A second lateral side surface 323E of the second bolt portion 321E elongated along the second right-triangular cylinder, and the right angle of the second lateral side surface 323E is located at the connection ends of the second bolt portion 321E and the second stopping portion 322E. Namely, the second end surface 324E and the second lateral side surface 323E form the right angle of the second right-triangular cylinder.

Referring to FIG. 1 and FIG. 2A, opposing edges of a first surface 21A of a cell stack 20A are individually furnished with respective first recess portions 22A, 23A, while opposing edges of a first surface 21B of another cell stack 20B are individually furnished with respective second recess portions 22B, 23B. Since the cell stacks 20A, 20B and the housing 10 are arranged in a loose-fit manner, so a gap G0 exists between the first surface 21A of the cell stack 20A and the first surface 21B of the cell stack 20B.

In this embodiment, the first recess portion 22A and the second recess portion 22B are paired and integrated to form a recess structure for receiving the first stopping portion 312, while another first recess portion 23A and the second recess portion 23B are paired and integrated to for another recess structure for receiving the second stopping portion 322.

As shown in FIG. 2A, the first bolt portion 311 of the first plugin member 31 and the second bolt portion 321 of the second plugin member 32 are individually inserted into the gap G0 between the two cell stacks 20A, 20B from opposing sides of the two cell stacks 20A, 20B.

Figure 2B:
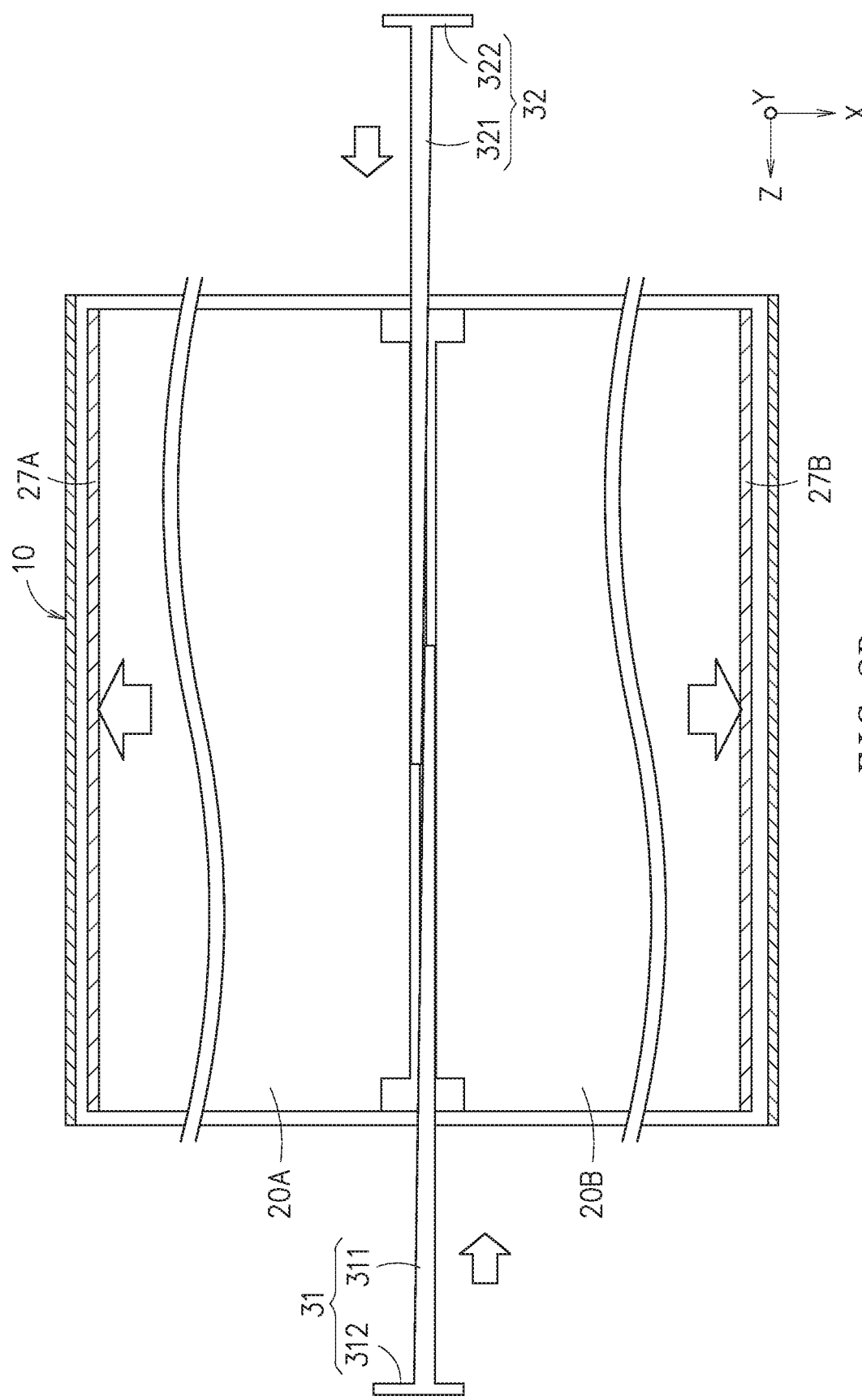

Further, as shown in FIG. 2B, since the first bolt portion 311 and the second bolt portion 321 are extended in a tapering manner away from the first stopping portion 312 and the second stopping portion 322, respectively, thus, when the first bolt portion 311 and the second bolt portion 321 are individually and forcedly inserted into the gap G0 between the cell stacks 20A, 20B from opposing sides of the battery module, these two cell stacks 20A, 20B would be pushed outward oppositely in a direction parallel the X-axis.

Figure 2C:
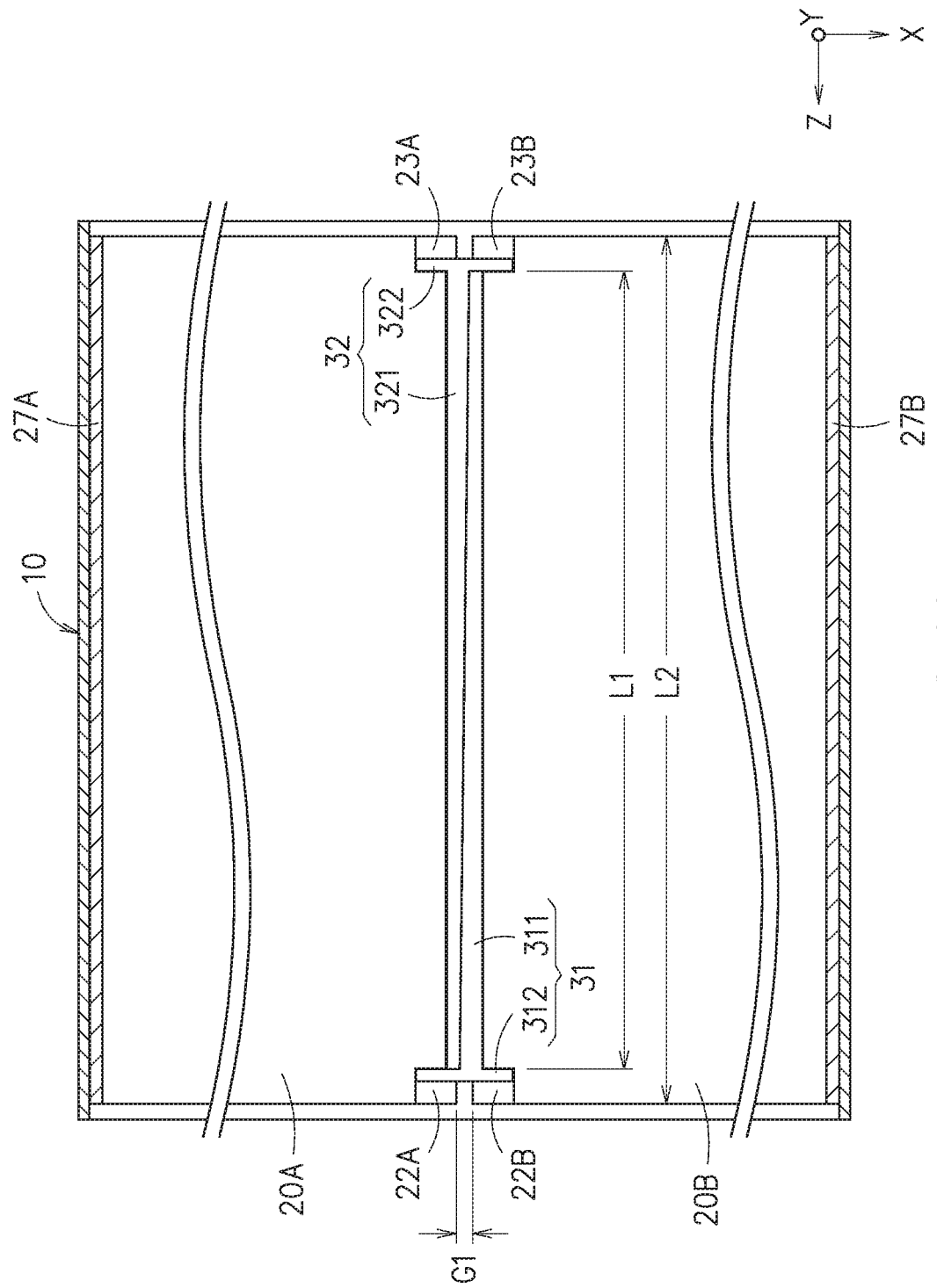

Finally, as shown in FIG. 2C, when the first stopping portion 312 of the first plugin member 31 and the second stopping portion 322 of the second plugin member 32 are fitted into a combined recess integrating the first recess portion 22A and the second recess portion 22B, and another recess integrating the first recess portion 23A and the second recess portion 23B, respectively, then the two opposing outer lateral surfaces of the cell stacks 20A, 20B would be forcedly depressed against the housing 10. Thereupon, the two thermal conductive elements 27A, 27B would be individually squeezed inside the gap between the cell stack 20A and the housing 10, and another gap between the cell stack 20B and the housing 10, respectively, such that the cell stacks 20A, the thermal conductive element 27A and the housing 10 would be connected together in a close fit, while the cell stack 20B, the thermal conductive element 27B and the housing 10 would be also connected together in another close fit. Thereby, heat generated by the cell stacks 20A, 20B can be dissipated out of the housing 10 through the thermal conductive elements 27A, 27B, respectively. Thus, heat can be effectively transferred, by conduction, out of the housing 10, and hence possible heat accumulation inside the housing 10 would be resolved. It shall be noted that, when the first stopping portion 312 of the first plugin member 31 and the second stopping portion 322 of the second plugin member 32 are located in (the first recess portion 22A and the second recess portion 22B), and (the first recess portion 23A and the second recess portion 23B), respectively, a gap G1 would be formed between the two cell stacks 20A, 20B, in which gap G1>gap G0. In one embodiment, the gap G1 can be functioned as a natural heat insulation layer for so how blocking the heat transfer between the two cell stacks 20A, 20B.

In one embodiment, a plurality of screw holes (not shown in the figure) can be furnished to both the first stopping portion 312 and the second stopping portion 322, so that the first stopping portion 312 and the second stopping portion 322 can be screw-fixed to the cell stacks 20A, 20B.

As shown in FIG. 2C, a length L1 of the first bolt portion 311 or the second bolt portion 321 is less than a length L2 of the cell stack 20A or 20B. In some other embodiments not shown herein, it is still possible that the length of the first bolt portion 311 or the second bolt portion 321 can be equal to that of the cell stack 20A or 20B according to specific dimension arrangement upon the cell stacks and the housing.

It shall be explained that, in the embodiment shown in FIG. 1 through FIG. 2C, the housing 10 contains two cell stacks 20A, 20B. However, in some other embodiments, the housing 10 can only contain one single cell stack 20A (or 20B).

Figure 2D:
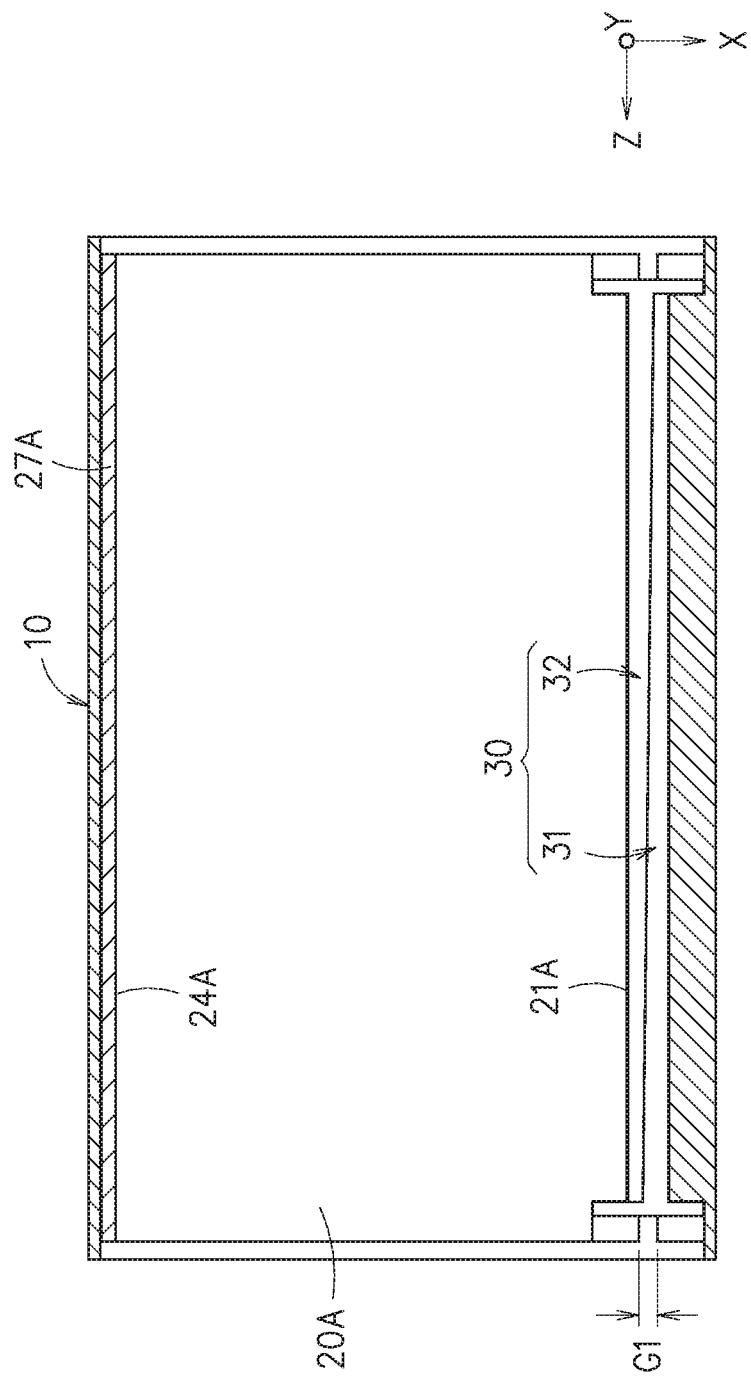
FIG. 2D is a schematic top view of another embodiment of the tightening assembly in accordance with this disclosure, showing by which one cell stack is tightly fitted to the housing in a direction parallel the X-axis.

Referring to FIG. 2D, only one cell stack 20A is contained inside the housing 10. The pattern of mounting the tightening assembly 30 is similar to that of the aforesaid embodiment having two cell stacks 20A, 20B. In this embodiment, with the tightening assembly 30 to be inserted between the cell stack 20A and the housing 10, a gap G1 would be expanded between a first surface 21A of the cell stack 20A and the housing 10, such that a second surface 24A opposing to the first surface 21A of the cell stack 20A would be depressed onto the housing 10. A thermal conductive element 27A is disposed in the gap between the second surface 24A of the cell stack 20 and the housing 10, such that the cell stack 20A, the thermal conductive element 27A and the housing 10 can be connected together tightly; i.e., in a close-fit manner Thereupon, the heat generated by the cell stack 20A can be conducted to the housing 10 via the thermal conductive element 27A, and then dissipated into the atmosphere. In this embodiment, shapes and dimensions of the first plugin member 31 and the second plugin member 32 of the tightening assembly 30 are simply an exemplary example. In some other embodiments, shapes and dimensions of the first plugin member 31 and the second plugin member 32 of the tightening assembly 30 can be varied per specific requirements. In addition, since the tightening assembly 30 is made of a metal or plastics with specific stiffness, thus sufficient stress can be always provided to generate enough tightening.

Figure 4A:
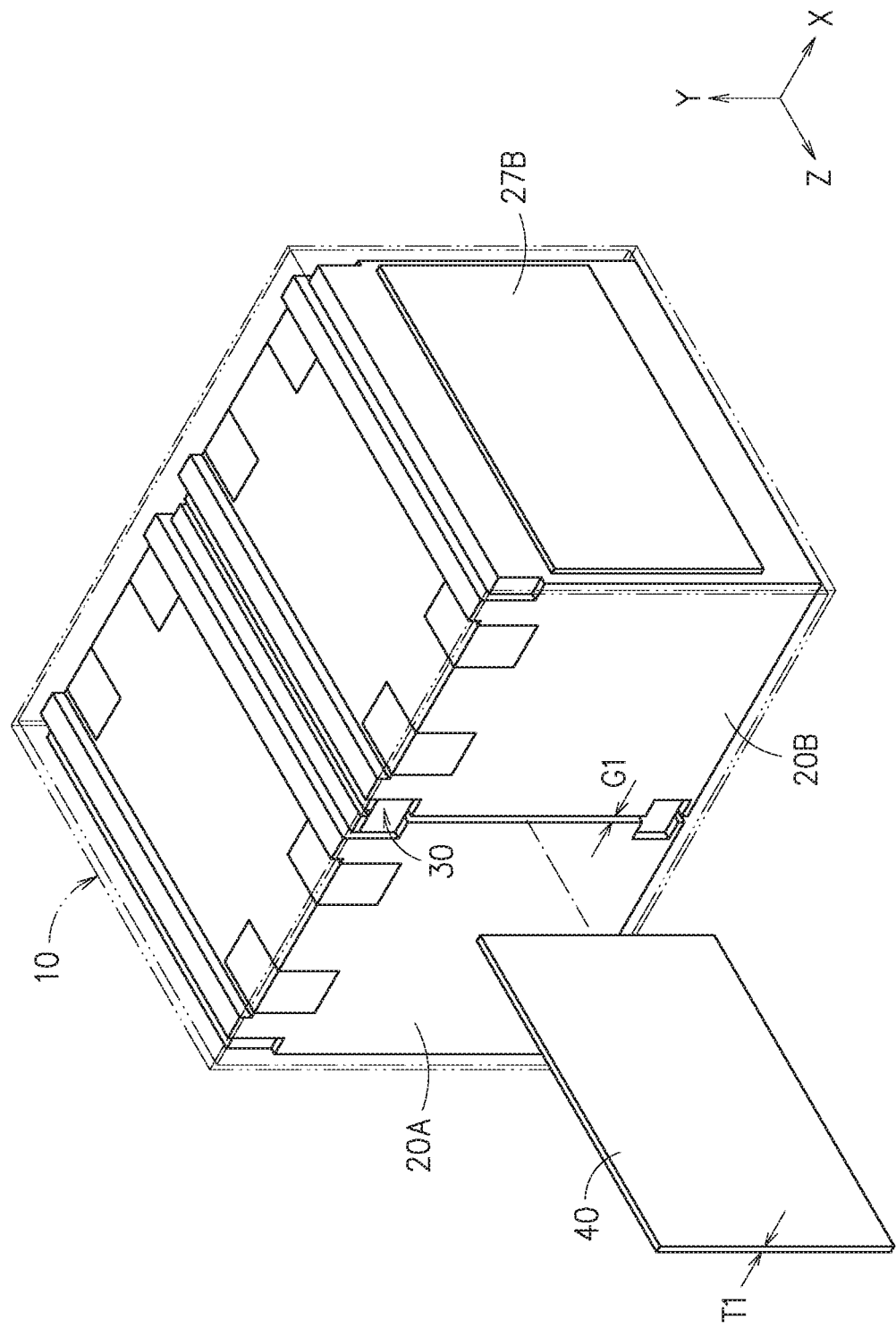
FIG. 4A is a schematic perspective view of an embodiment of a stuff-insert element to be inserted between the two cell stacks of FIG. 1 in accordance with this disclosure.

Referring to FIG. 4A, after the tightening assembly 30 of FIG. 1 is set in position, a gap G1 is formed between the two cell stacks 20A, 20B. Then, a stuff-insert element 40 can be inserted into the gap G1. In one embodiment, the stuff-insert element 40 can be made of a thermal insulation material for blocking the heat transfer between the two cell stacks 20A, 20B. In another embodiment, the stuff-insert element 40 can be made of a thermal conductive material such as a compressible thermal conductive elastomer (a silicone for example), or can be formed as a sealed bag (such as a hydrogel aluminum foil bag) filled with thermal conductive fluids or gels. In particular, the bag can have a toughness that present wear-resistant and bendable properties, and thus the bag won't be broken while in meeting squeezing or other forcing. Through the stuff-insert element 40, the heat generated by the two cell stacks 20A, 20B can be conducted and dissipated to the atmosphere. In this disclosure, the material for the stuff-insert element 40 is not limited to be a soft or rigid material. In addition, the stuff-insert element 40 can be formed as a square having a first thickness T1 to pair the gap G1 in a loose-fit manner Thereupon, the stuff-insert element 40 can be easily inserted into and positioned inside the gap G1.

In one embodiment, the tightening assembly 30 (including the first plugin member 31 and the second plugin member 32) can be removed after the stuff-insert element 40 is placed into the gap G1. Then, the stuff-insert element 40 can provide expansion forcing to push the two cell stacks 20A, 20B outward against the housing 10. In detail, after the tightening assembly 30 is positioned in the gap, the space between the two cell stacks 20A, 20B would be expanded from the original gap G0 to the instant gap G1. In particular, the stuff-insert element 40 has a first thickness T1 slightly larger than a thickness of the gap G0, but the first thickness T1 and the gap G1 would be paired into a loose fit of the stuff-insert element 40 between the two cell stacks 20A, 20B. Thus, after the stuff-insert element 40 is inserted into the gap G1, the removal of the tightening assembly 30 would make the gap G1 narrower to a degree for presenting a close fit to the stuff-insert element 40 between the two cell stacks 20A, 20B. Thus, the stuff-insert element 40 would tend to expand and thus push the two cell stacks 20A, 20B outward against the housing 10 in a direction parallel the X-axis. It shall be noted that, when the stuff-insert element 40 is used as a squeeze-fit member, it will provide forcing to depress the two cell stacks 20A, 20B outward against the housing 10. In this disclosure, the stuff-insert element 40 can be made of, but not limited to, a rigid material such as a metal or a plastics.

Figure 4C:
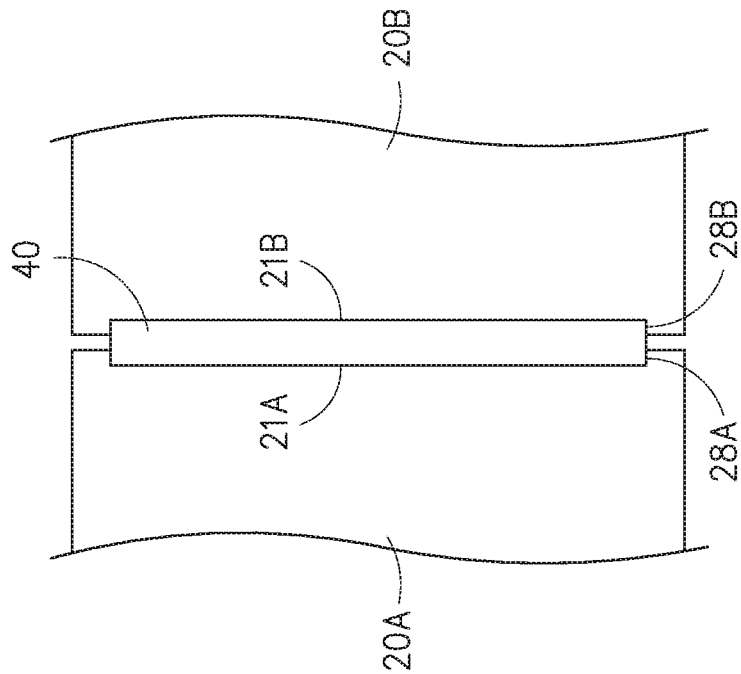
FIG. 4C is a schematic view showing the stuff-insert element of FIG. 4A being disposed between the two cell stacks of FIG. 1 already been tightened by the tightening assembly.
Figure 4B:
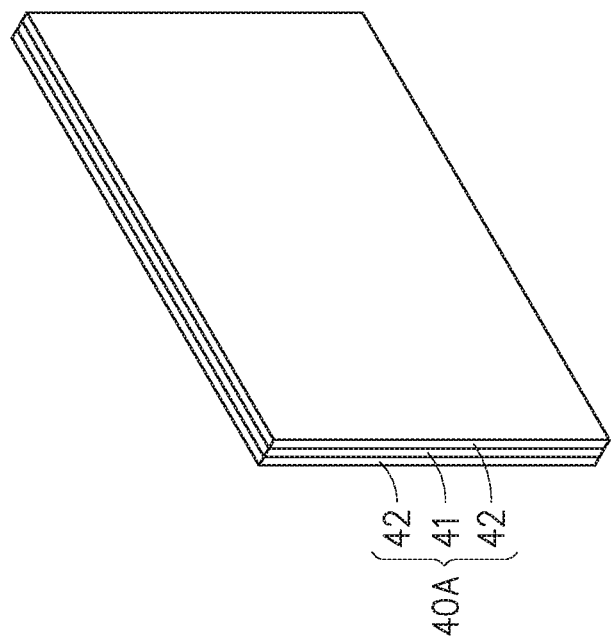
FIG. 4B is a schematic perspective view of another embodiment of the stuff-insert element in accordance with this disclosure.

Referring to FIG. 4B, in one embodiment, the stuff-insert element 40A can have properties in both heat conduction and heat dissipation. In detail, the stuff-insert element 40A includes a middle rigid portion 41 and two thermal conductive layers 42. The middle rigid portion 41 can be made of a metal material, or can be a heat-exchange component with cooling capacity. Two thermal conductive layers 42 are laminated individually to two opposing sides of the middle rigid portion 41. When the stuff-insert element 40A is inserted into the gap between the two cell stacks 20A, 20B, the two lateral thermal conductive layers 42 would contact at the corresponding cell stacks 20A, 20B, so that the heat generated by the cell stacks 20A, 20B would be conducted to the housing 10 via the two thermal conductive layers 42. On the other hand, the middle rigid portion 41 would provide a solid base for applying forces to push the two cell stacks 20A, 20B outward against the housing 10 in a direction parallel the X-axis, and thus a close fit can be formed in the battery module. In one embodiment, the thermal conductive layer 42 can be made of, but not limited to, the same material of the aforesaid thermal conductive element 27A or 27B.

As shown in FIG. 4A, in this embodiment, after the stuff-insert element 40 is inserted in position, then the tightening assemblies 30 is removed. At this time, a stopping element (not shown in the figure) can be introduced to be located at the original position having the tightening assembly 30, such that any displacement of the stuff-insert element 40 in a direction other than the X-axial direction (i.e., the application direction) can be avoided.

Referring further to FIG. 4C, in this embodiment, position grooves 28A, 28B are furnished to first surfaces 21A, 21B of the cell stacks 20A, 20B, respectively. With the two position grooves 28A, 28B, the gap between the two cell stacks 20A, 20B is further shaped for positioning and also restraining the stuff-insert element 40, such that any displacement of the stuff-insert element 40 in a direction other than the X-axial direction (i.e., the application direction) can be avoided.

After the operation of FIG. 4A is finished, it implies that the two cell stacks 20A, 20B would now have been pushed outward against the housing 10 in a direction parallel the X-axis. Then, referring to FIG. 5, operations for applying pushing upon the two cell stacks 20A, 20B in a direction parallel the Y-axis can now be performed.

Figure 5:
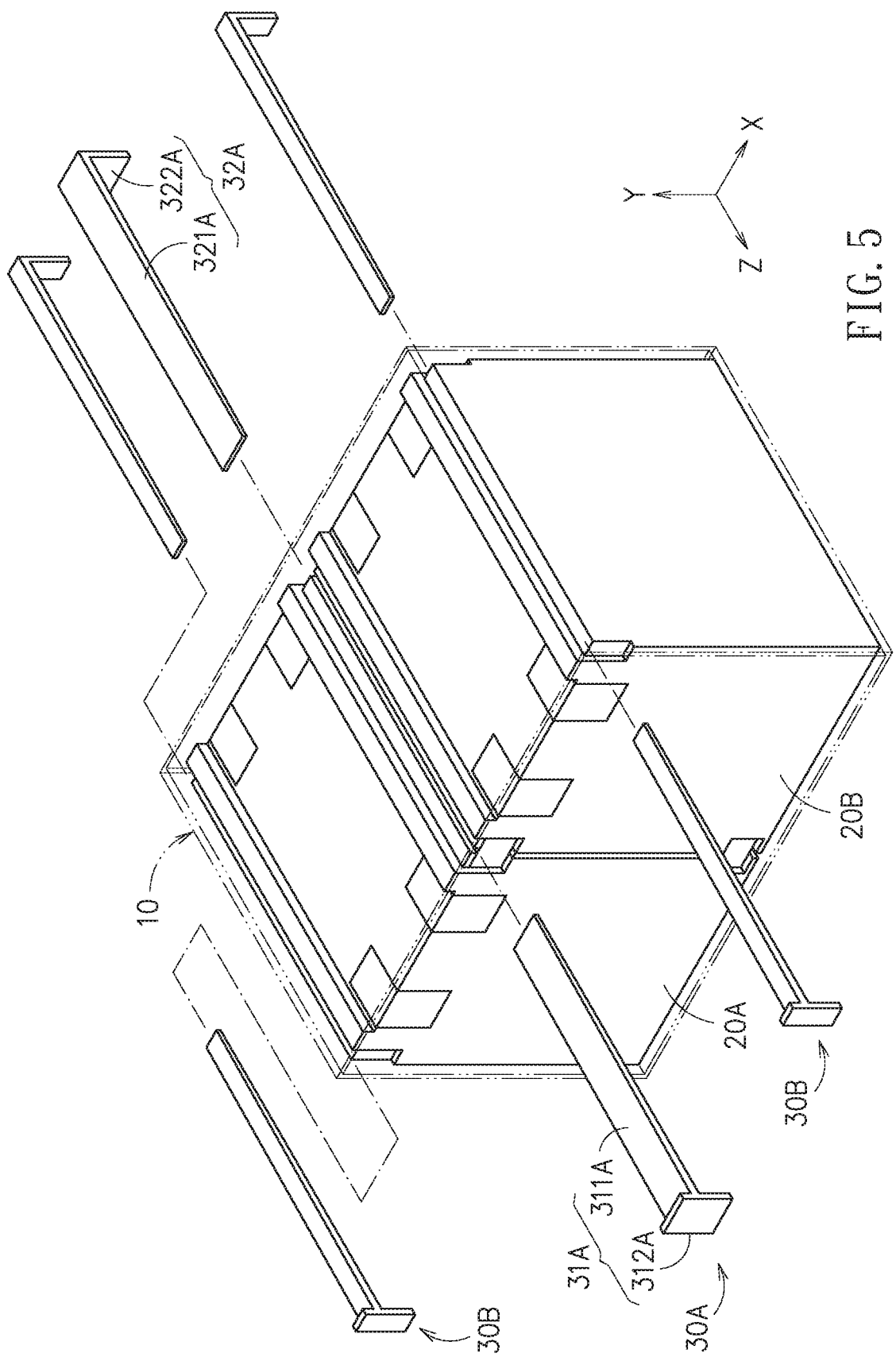
FIG. 5 is a schematic perspective view of another embodiment of the tightening assembly in accordance with this disclosure, showing by which two cell stacks are tightly fitted to the housing in a direction parallel a Y-axis.

As shown in FIG. 5, on top of the two cell stacks 20A, 20B, three sets of the tightening assemblies 30A, 30B (two sets of the tightening assemblies 30B and one set of the tightening assembly 30A) are furnished. Structuring of each of the tightening assemblies 30A, 30B is resembled to that of the tightening assembly 30 shown in FIG. 1, with slight differences in dimensions and the shape of the stopping portion. Yet, the basic structuring of the tightening assembly to include an end stopping portion and an extending bolt portion are the same. In addition, in all embodiments, the bolt portion is formed as a tapering cylinder.

By having the tightening assembly 30A as an example, the tightening assembly 30A includes a first plugin member 31A and a second plugin member 32A. The first plugin member 31A further includes a first stopping portion 312A and a first bolt portion 311A, while the second plugin member 32A includes a second stopping portion 322A and a second bolt portion 321A. The first bolt portion 311A is extended in a tapering manner away from the first stopping portion 312A, and the second bolt portion 321A is also extended in a tapering manner away from the second stopping portion 322A. The tightening assembly 30B is similarly structured as the tightening assembly 30A, and the difference in between is the dimension. In this embodiment, the tightening assemblies 30A, 30B are also applicable to that of FIG. 2D having a single cell stack 20A.

Figure 6:
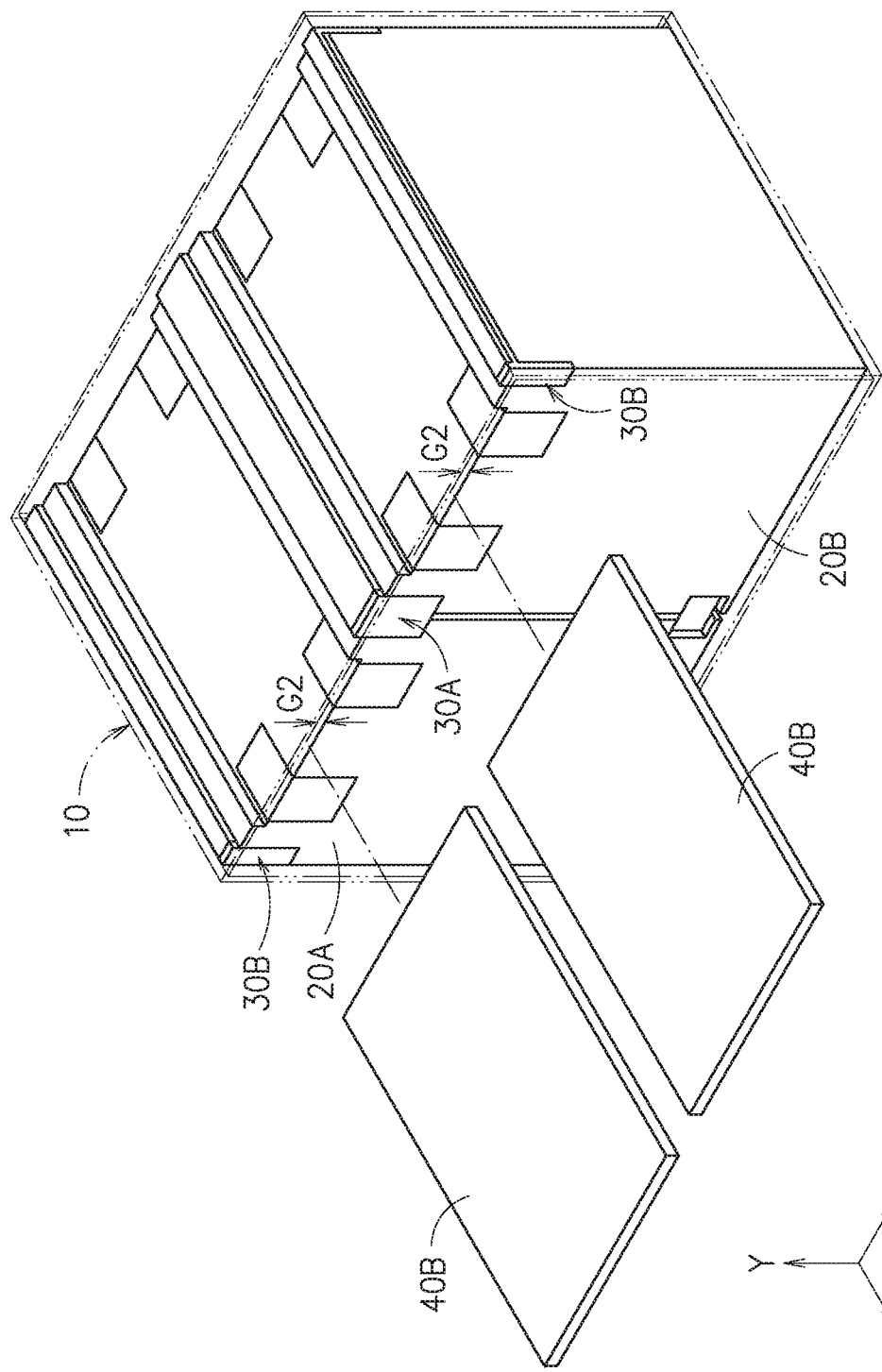
FIG. 6 is a schematic perspective view of the stuff-insert element to be inserted into the housing of FIG. 5 having the two cell stacks already been tightened by the tightening assembly in accordance with this disclosure.

Referring now to FIG. 6, after the tightening assemblies 30A, 30B of FIG. 5 are individually placed in position, two gaps G2 are formed between tops of the two cell stacks 20A, 20B and the housing 10. Each of the two gaps G2 can be directly used as a heat insulation layer, or inserted by a thermal insulation or conduction element (not shown in the figure) for providing thermal insulation or conduction, respectively. In another embodiment, any of the tightening assemblies 30A, 30B can be removed after the stuff-insert elements 40B are individually inserted into the corresponding gaps G2. The two stuff-insert elements 40B can tighten the two cell stacks 20A, 20B together with the housing 10 in a direction parallel the Y-axis. The stuff-insert element 40B herein is similar structurally to the aforesaid stuff-insert element 40 or 40A, with the difference in dimensions. The method herein for inserting the stuff-insert element 40B into the corresponding gap G2 is also the same as the aforesaid method described above, and thus details thereabout are omitted herein. In addition, a stopping element (not shown in the figure) can be introduced to be located at the original position having the tightening assembly 30A or 30B, such that any displacement of the stuff-insert element 40B in a direction other than the Y-axial direction (i.e., the application direction) can be avoided.

After the operation shown in FIG. 6 is complete, it implies that the two cell stacks 20A, 20B would now have been pushed outward against the housing 10 in both the direction parallel the X-axis and the direction parallel the Y-axis.

Figure 7:
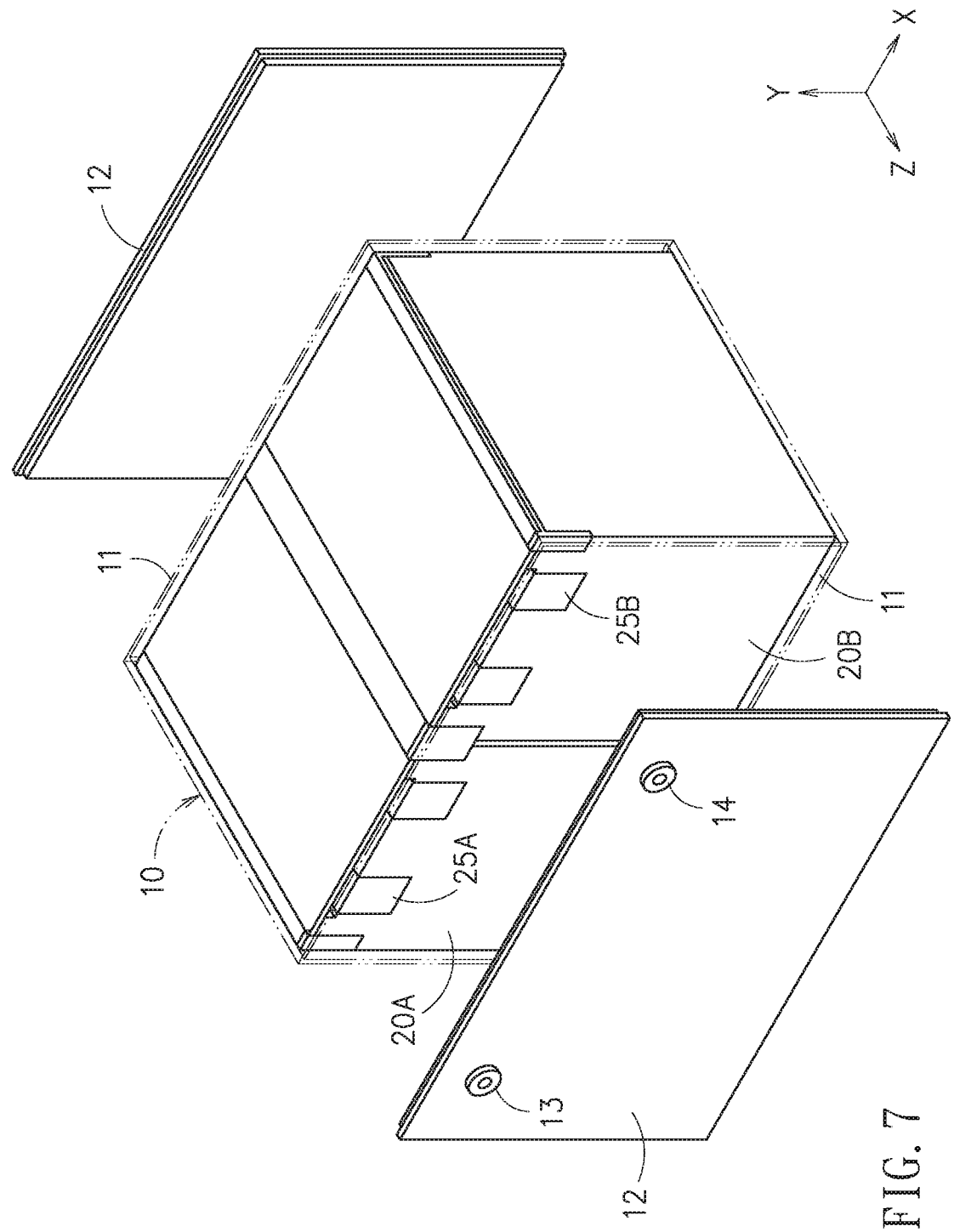
FIG. 7 and FIG. 8 are respectively schematic exploded and assembled views of two cover plates of this disclosure and the battery module of FIG. 6 shielded by the two cover plates oppositely in a direction parallel a Z-axis.
Figure 8:
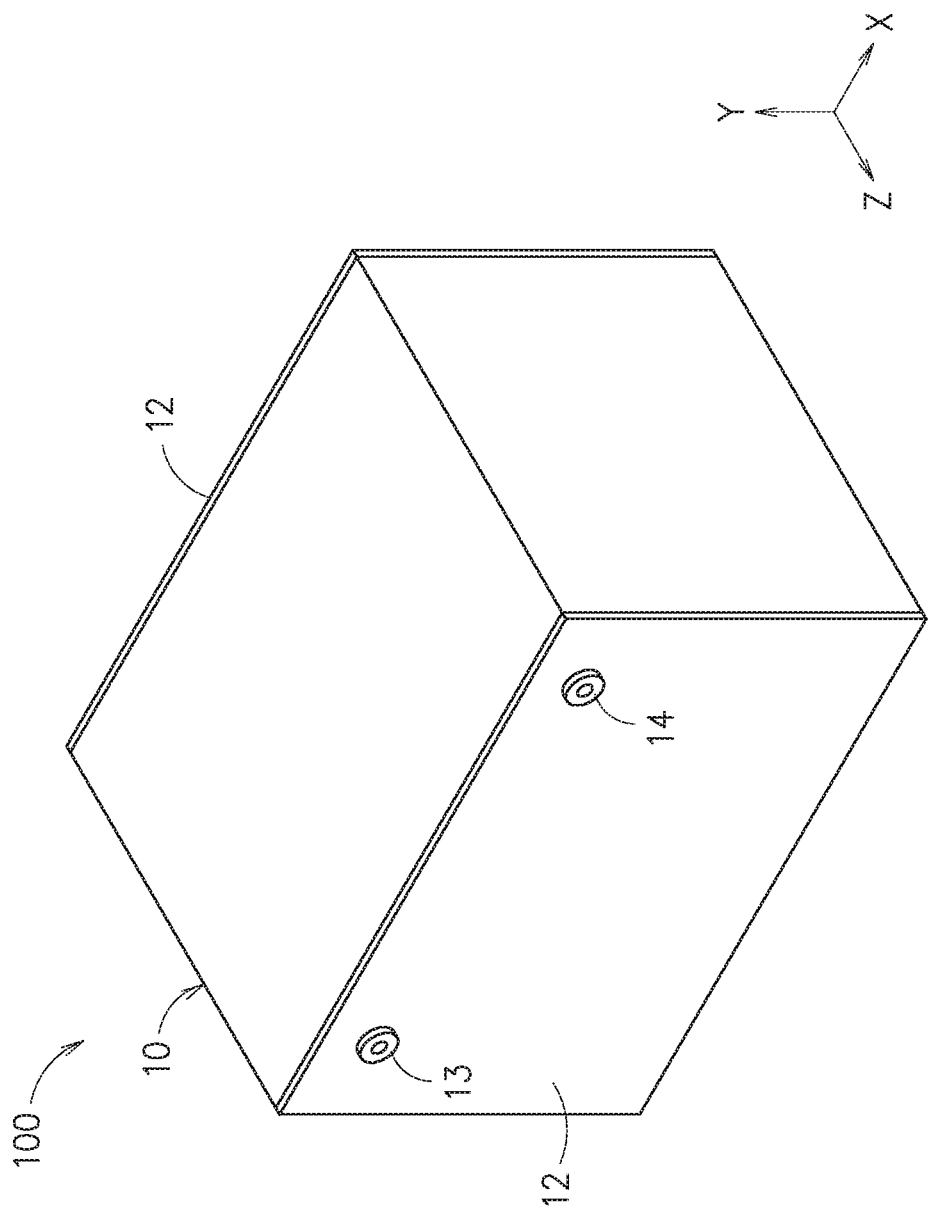

Then, referring to FIG. 7, two cover plates 12 would be individually mounted to the corresponding open sides 11 of the housing 10 in a direction parallel the Z-axis, such that the two cell stacks 20A, 20B can be tightened in the direction parallel the Z-axias. One of the two cover plates 12 is furnished with two connection terminals 13, 14 at positions respective to two different poles 25A, 25B (positive and negative poles) at the cell stacks 20A, 20B, so as to form the battery module 100 shown in FIG. 8.

Figure 9:
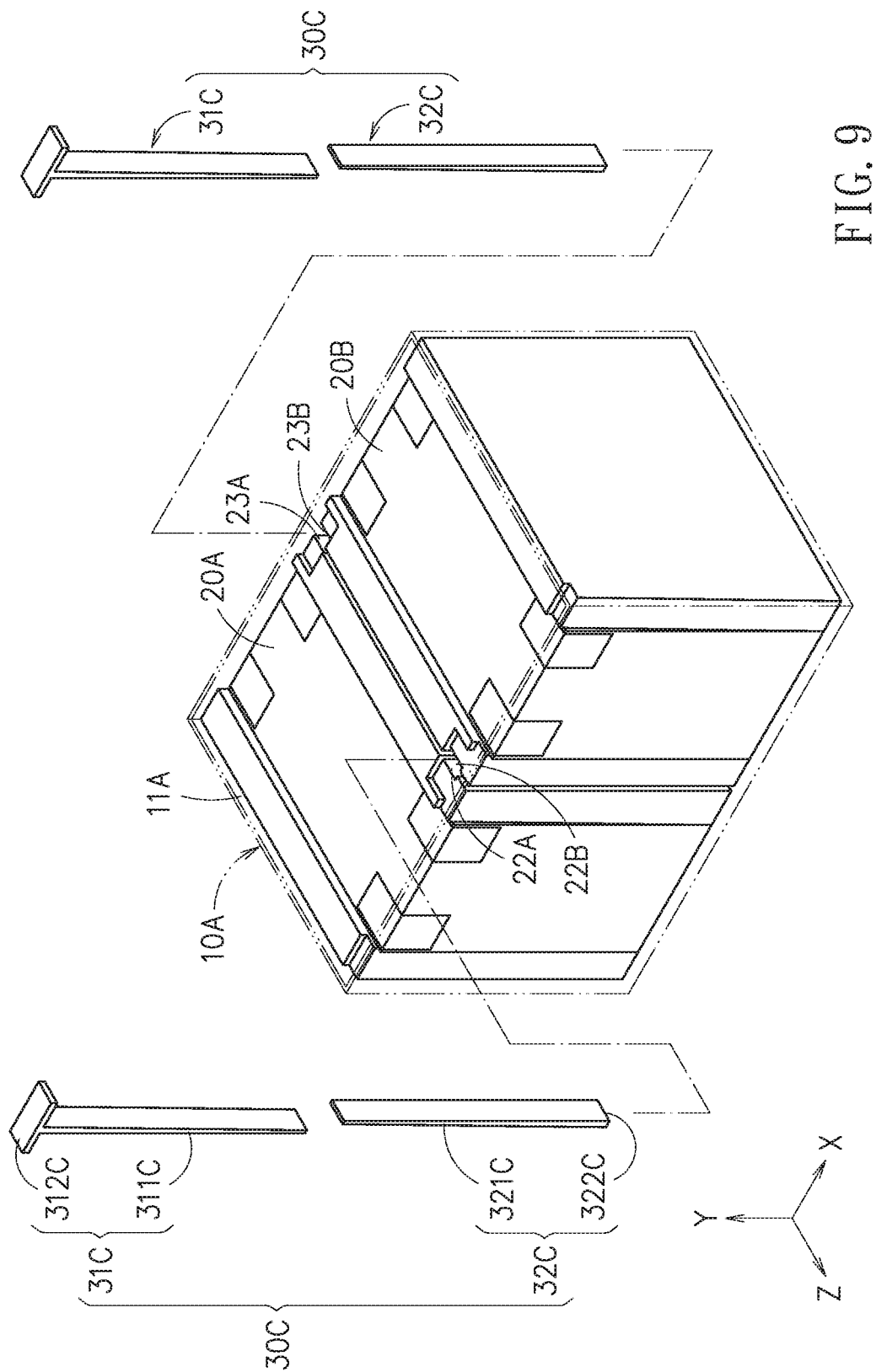
FIG. 9 is a schematic perspective view of a further embodiment of the tightening assembly in accordance with this disclosure for tightening two cell stacks to a housing in a direction parallel the X-axis.

Referring now to FIG. 9, the embodiment shown herein is similar to that of FIG. 1. However, it shall be noted that, in this embodiment, the housing 10A simply has an open side 11A located on top of the housing 10A in a direction parallel the Y-axis. With only one open side 11A in this embodiment, the aforesaid operation of inserting a first plugin member 31 and a second plugin member 32 into the housing 10A from opposing sides thereof, as shown in FIG. 1, is no more possible. Thus, the tightening assembly 30C of FIG. 9 and the tightening assembly 30 of FIG. 1 are different in structuring.

The tightening assembly 30C of FIG. 9 includes a first plugin member 31C and a second plugin member 32C. The first plugin member 31C includes a first bolt portion 311C and a first stopping portion 312C, while the second plugin member 32C includes a second bolt portion 321C and a second stopping portion 322C. The first bolt portion 311C is extended in a tapering manner away from the first stopping portion 312C, and the second bolt portion 321C is also extended in a tapering manner away from the second stopping portion 322C. In this embodiment, a shape of the second stopping portion 322C is the same as the connection portion of the second stopping portion 322C and the second bolt portion 321C, or the second plugin member 32C can be treated as a part without the second stopping portion 322C.

The tightening assemblies 30C are used to provide tightening upon the two cell stacks 20A, 20B in a direction parallel the X-axis. Firstly, the two second plugin members 32C are individually applied to be inserted into the counter second recess portions 22B, 23B at the neighboring corner edges of the two cell stacks 20A, 20B. As shown in FIG. 9, the second stopping portion 322C is located at the lower end of the second bolt portion 321C. Then, the two first plugin members 31C are individually inserted into the two first recess portions 22A, 23A. As two tapering parts, the first plugin member 31C and the second plugin member 32C demonstrate an approach-to-lock manner as that described in the first plugin member 31 and the second plugin member 32 of FIG. 1. Each of the tightening assemblies 30A, 30B of this embodiment is also applicable to the single cell stack 2A of FIG. 2D.

Figure 10:
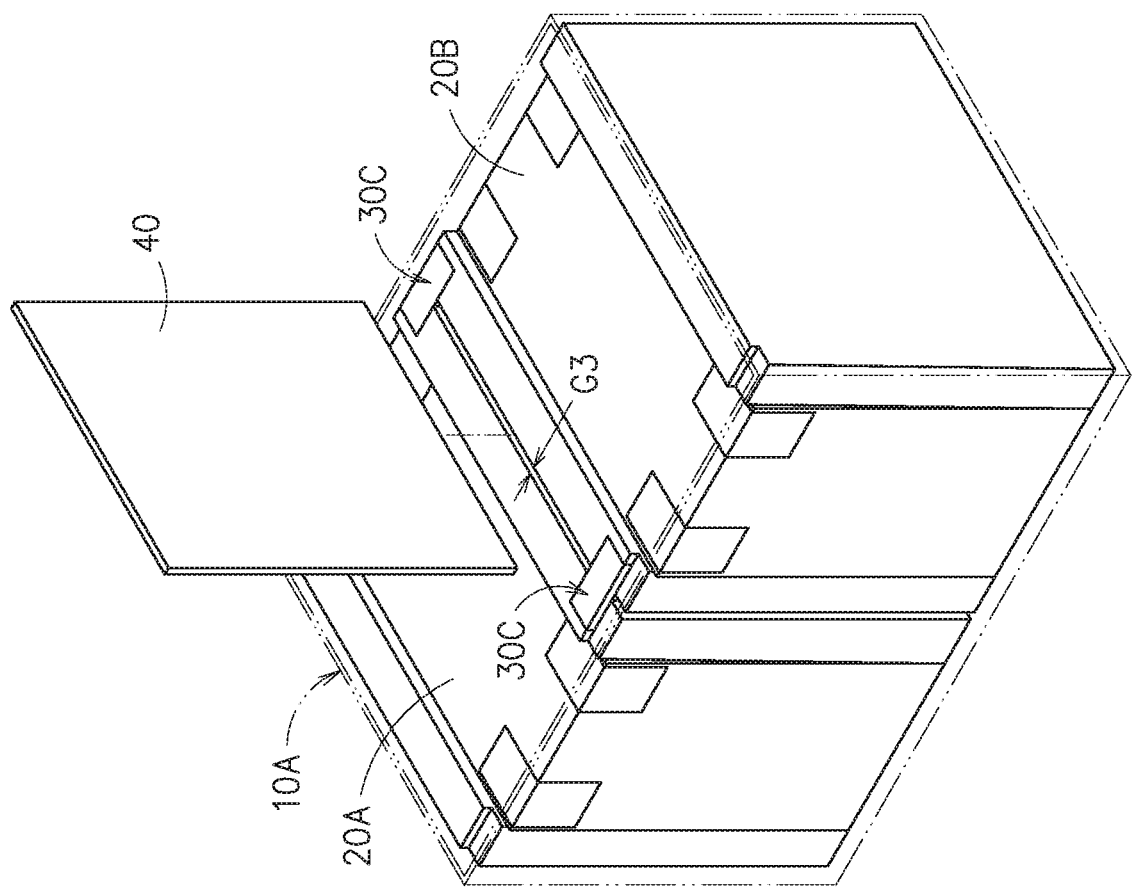
FIG. 10 is a schematic perspective view of the stuff-insert element to be inserted between the two cell stacks of FIG. 9 already been tightened by the tightening assembly in accordance with this disclosure.

Referring to FIG. 10, after the tightening assemblies 30C of FIG. 9 are placed in position, a gap G3 would be formed between the two cell stacks 20A, 20B. The gap G3 can be directly used as a heat insulation layer, or inserted by a thermal insulation or conduction element (not shown in the figure) for providing thermal insulation or conduction, respectively. In another embodiment, any of the tightening assemblies 30C can be removed after the stuff-insert element 40 is inserted into the gap G3, such that the gap G3 would become narrower to tighten the stuff-insert element 40 with the two cell stacks 20A, 20B in a direction parallel the X-axis. Namely, the stuff-insert element 40 can tighten the two cell stacks 20A, 20B together with the housing 10A.

Figure 11:
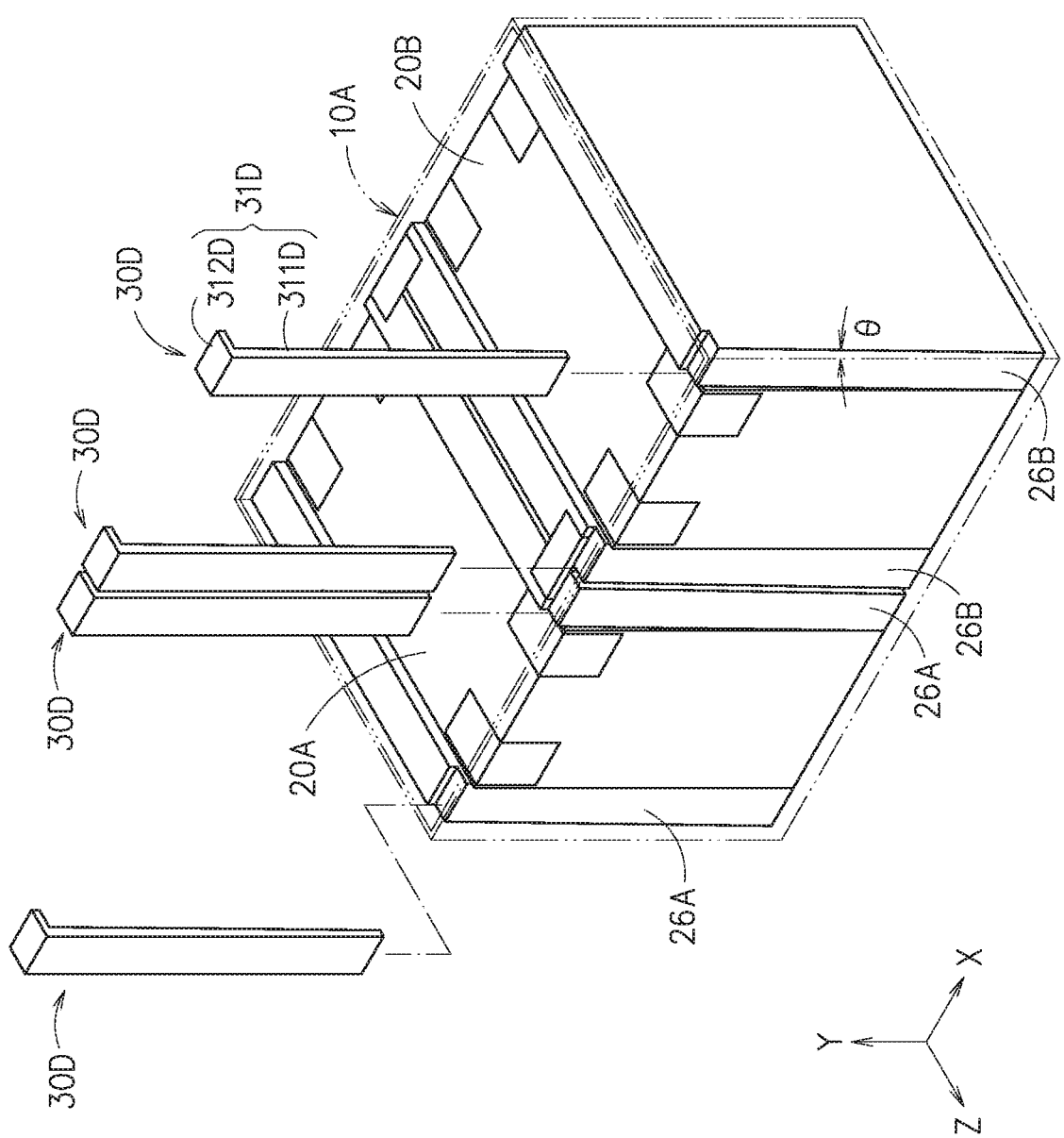
FIG. 11 is a schematic perspective view of one more embodiment of the tightening assembly in accordance with this disclosure for tightening two cell stacks to the housing in a direction parallel the Z-axis.

Referring to FIG. 11, each of two lateral surfaces 26A, 26B of the housing 10A corresponding to the two cell stacks 20A, 20B in a direction parallel the Z-axis has an angle of inclination θ, such that a gap having a wider top portion is formed between each of the cell stacks 20A, 20B and the corresponding lateral surface 26A or 26B of the housing 10A.

In this embodiment, four sets of the tightening assemblies 30D are applied to insert spacing between the cell stacks 20A, 20B and the neighboring housing 10A. Each of the tightening assemblies 30D includes a first plugin member 31D having a first bolt portion 311D and a first stopping portion 312D.

In comparison with the aforesaid tightening assemblies 30, 30A-30C, the major feature of this embodiment is that the second plugin member and the cell stacks 20A, 20B are integrated as a unique piece. In other words, each of the two lateral surfaces 26A, 26B can be treated as a second plugin member. Thus, after each of the first plugin members 31D is inserted into the gap corresponding to the lateral surface 26A or 26B, the two cell stacks 20A, 20B can then be tightened to the housing 10A in the direction parallel the Z-axis. In addition, the tightening assembly 30D of this embodiment is applicable to the embodiment of FIG. 2D having one single cell stack 2A.

Figure 12:
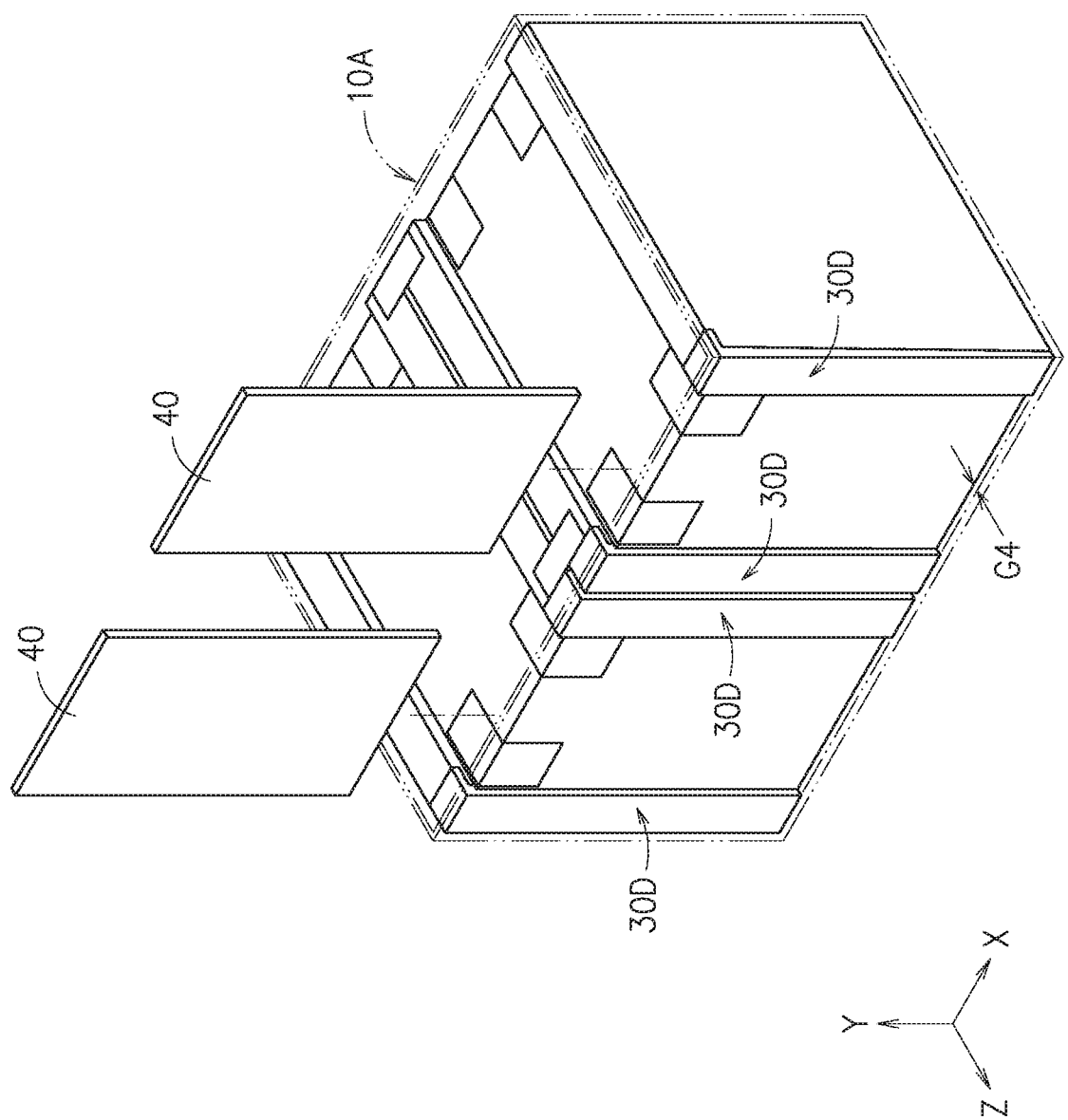
FIG. 12 is a schematic perspective view of two stuff-insert elements to be inserted into the battery module of FIG. 11 already been tightened by the tightening assembly in accordance with this disclosure.

Referring to FIG. 12, after the tightening assemblies 30D of FIG. 11 are placed in position, a gap G4 would be formed between the two cell stacks 20A, 20B and the housing 10A. The gap G4 can be directly used as a heat insulation layer, or inserted by a thermal insulation or conduction element (not shown in the figure) for providing thermal insulation or conduction, respectively. In another embodiment, any of the tightening assemblies 30D can be removed after the stuff-insert element 40 is inserted into the gap G4. Then, the stuff-insert element 40 can be used to tighten the two cell stacks 20A, 20B to the neighboring housing 10A in a direction parallel the Z-axis. Namely, the stuff-insert element 40 can tighten the two cell stacks 20A, 20B together with the housing 10A. It shall be noted that, in this embodiment, the stuff-insert element 40 can have different thickness T1 to meet different gaps G1, G2, G3, G4.

Figure 13:
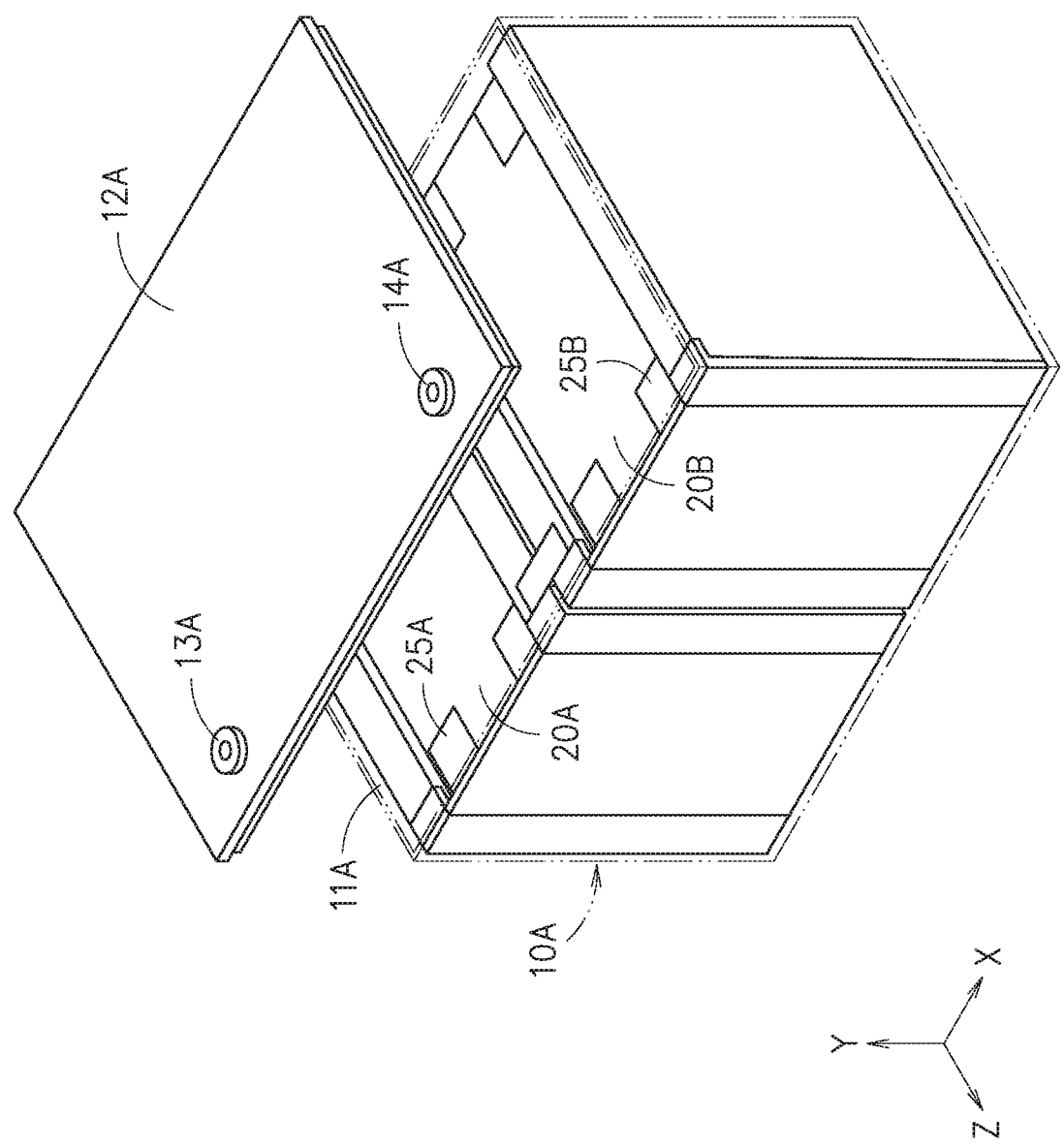
FIG. 13 and FIG. 14 are respectively schematic exploded and assembled views of one cover plate of this disclosure and the battery module of FIG. 12 shielded by the cover plate in a direction parallel the Y-axis.
Figure 14:
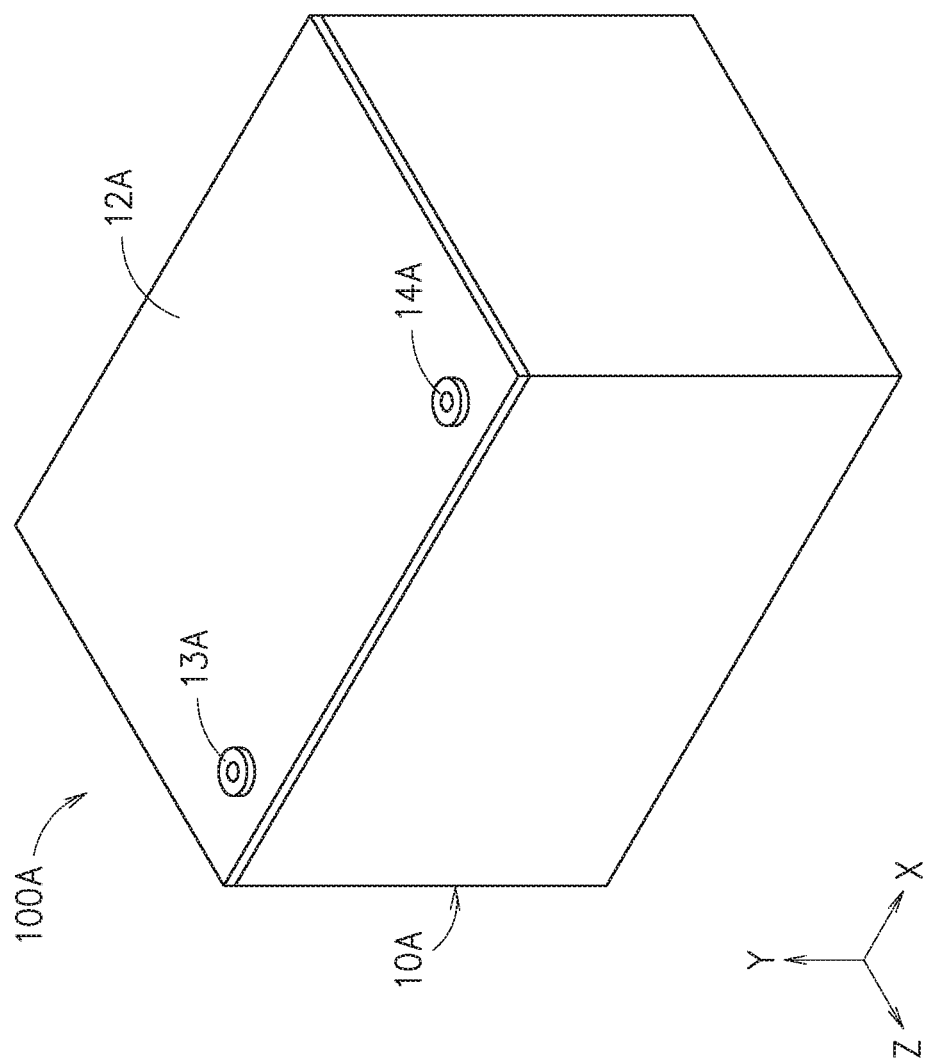

Referring to FIG. 13 and FIG. 14, after the operation shown in FIG. 12 is furnished, the tightening of the cell stacks 20A, 20B to the housing 10A in both the direction parallel the X-axis and the direction parallel the Z-axis are complete. Then, as shown in FIG. 13, the cover plate 12A is mounted to the open side 11A of the housing 10A in the direction parallel the Y-axis, so that the cell stacks 20A, 20B can be provided with tightening and constraints in the Y-axial direction. As shown, the cover plate 12A is further furnished with two connection terminals 13A, 14A at positions respective to two different poles 25A, 25B (positive and negative poles) at the cell stacks 20A, 20B, so as to form the battery module 100A shown in FIG. 14.

In summary, the tightening assembly provided by this disclosure is used to generate forcing to tighten the cell stacks to the housing in a close fit manner Beside the tightening assembly can provide gap-filling and positioning, after the thermal conductive element is inserted between the cell stack and the housing, the heat generated by the cell stack can be conducted to the housing for further heat dissipation. Thus, this disclosure realizes the tightening assembly with lower cost but higher heat-dissipation performance. In addition, according to this disclosure, no screw is needed for tighten the cell stack to the housing, and all three axial gap-filling and constraints for the cell stack inside the battery module can be satisfied. Thereupon, no additional internal gap can exist, anti-shake performance of the battery module can be improved, and the entire structural strength can be significantly enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A battery module, comprising:
   a housing;
   at least one cell stack, disposed inside the housing;
   a tightening assembly, including:
     a first plugin member, having a first stopping portion and a first bolt portion connected with the first stopping portion, the first bolt portion being extended in a tapering manner away from the first stopping portion; and
     a second plugin member, having a second stopping portion and a second bolt portion connected with the second stopping portion, the second bolt portion being extended in the tapering manner away from the second stopping portion;
     wherein the first plugin member and the second plugin member are individually and detachably inserted into the battery module from two opposing sides of the at least one cell stack, and a second surface of the at least one cell stack, opposite the first surface, is tightened to the housing; and
   a thermal conductive element, disposed on the second surface, tightening the second surface of the at least one cell stack to the housing.

2. The battery module of claim 1, wherein the first bolt portion is formed as a first right-triangular cylinder, the first right-triangular cylinder has a first end surface connected with the first stopping portion, the second bolt portion is formed as a second right-triangular cylinder, and the second right-triangular cylinder has a second end surface connected with the second stopping portion.

3. The battery module of claim 2, wherein the first right-triangular cylinder has a first lateral side defined with a right angle located at a connection of the first bolt portion and the first stopping portion, and the second right-triangular cylinder has a second lateral side defined with another right angle located at a connection of the second bolt portion and the second stopping portion.

4. The battery module of claim 1, wherein the first bolt portion is a quadrangular tapering cylinder having a trapezoidal lateral side surface and a first end surface of the quadrangular tapering cylinder connected with the first stopping portion, and the second bolt portion is another quadrangular tapering cylinder having another trapezoidal lateral side surface and a second end surface of the another quadrangular tapering cylinder connected with the second stopping portion.

5. The battery module of claim 1, wherein each of the first stopping portion and the second stopping portion has a plurality of screw holes for the first stopping portion and the second stopping portion to be screw-fixed to the at least one cell stack.

6. The battery module of claim 1, wherein a shape of the second stopping portion is the same as a shape of a connection portion of the second stopping portion and the second bolt portion.

7. The battery module of claim 1, wherein a length of the first bolt portion is less than or equal to that of the at least one cell stack, and another length of the second bolt portion is less than or equal to that of the at least one cell stack.

8. The battery module of claim 1, wherein the tightening assembly is made of a metal or a plastics with specific stiffness.

9. The battery module of claim 1, further including a stuff-insert element, wherein, when the first plugin member and the second plugin member are inserted into the battery module from the two opposing sides of the at least one cell stack, a gap is formed between the first surface of the at least one cell stack and the housing, and the stuff-insert element is disposed in the gap.

10. The battery module of claim 9, wherein the stuff-insert element is one of a compressible thermal conductive elastomer and a sealed bag filled with a thermal conductive fluid or gel.

11. The battery module of claim 1, further including a stuff-insert element, wherein the at least one cell stack includes a plurality of cell stacks; wherein, when the first plugin member and the second plugin member are inserted into the battery module from the two opposing sides of the plurality of cell stacks, a gap is formed between the plurality of cell stacks, and the stuff-insert element is disposed in the gap.

12. The battery module of claim 11, wherein the stuff-insert element is one of a compressible thermal conductive elastomer and a sealed bag filled with a thermal conductive fluid or gel.

13. A battery module, comprising:
    a housing;
    at least one cell stack, disposed inside the housing;
    a stuff-insert element, disposed in a gap formed between a first surface of the at least one cell stack and the housing, wherein a second surface of the at least one cell stack, opposite the first surface of the at least one cell stacks, is tightened to the housing; and
    a thermal conductive element, disposed on the second surface, tightening the second surface of the at least one cell stack to the housing through the stuff-insert element;
    wherein the stuff-insert element is made of a rigid material and applies force to the first surface to tighten the second surface to the housing; and
    wherein the stuff-insert element includes a middle rigid portion and two thermal conductive layers laminated individually to two opposing sides of the middle rigid portion.

14. A battery module, comprising:
    a housing;
    a plurality of cell stacks, disposed inside the housing;
    a stuff-insert element, disposed in a gap formed between the plurality of cell stacks, wherein a second surface of the plurality of cell stacks, opposite a first surface of the plurality of cell stacks, is tightened to the housing; and
    a thermal conductive element, disposed on the second surface, tightening the second surface of the plurality of cell stacks to the housing through the thermal conductive element;
    wherein the stuff-insert element is made of a rigid material and applies force to the first surface to tighten the second surface to the housing; and
    wherein the stuff-insert element includes a middle rigid portion and two thermal conductive layers laminated individually to two opposing sides of the middle rigid portion.

* * * * *